(12) United States Patent
Peng et al.

(10) Patent No.: US 9,383,264 B2
(45) Date of Patent: Jul. 5, 2016

(54) SMALL AREA HIGH PERFORMANCE CELL-BASED THERMAL DIODE

(75) Inventors: Yung-Chow Peng, Hsinchu (TW);
Ching-Ho Chang, Hsinchu (TW);
Jui-Cheng Huang, Hsinchu (TW)

(73) Assignee: Taiwan Semiconductor Manufacturing Co., Ltd., Hsin-chu (TW)

( * ) Notice: Subject to any disclaimer, the term of this patent is extended or adjusted under 35 U.S.C. 154(b) by 316 days.

(21) Appl. No.: 13/428,549

(22) Filed: Mar. 23, 2012

(65) Prior Publication Data
US 2013/0195142 A1 Aug. 1, 2013

Related U.S. Application Data (60) Provisional application No. 61/592,658, filed on Jan. 31, 2012.

(51) Int. Cl.
*G01K 7/00* (2006.01)
*G01K 7/01* (2006.01)

(52) U.S. Cl.
CPC . *G01K 7/01* (2013.01); *Y10T 307/76* (2015.04)

(58) Field of Classification Search
USPC ............. 374/178, 170, 172; 331/57, 158, 176
See application file for complete search history.

(56) References Cited

U.S. PATENT DOCUMENTS

| | | | | |
|---|---|---|---|---|
| 4,165,642 | A * | 8/1979 | Lipp | 374/170 |
| 5,085,526 | A * | 2/1992 | Sawtell et al. | 374/101 |
| 5,175,452 | A * | 12/1992 | Lupi et al. | 327/262 |
| 7,262,727 | B1 * | 8/2007 | Chen et al. | 341/145 |
| 8,094,055 | B2 * | 1/2012 | Gaknoki | H03M 1/68 341/118 |
| 8,229,987 | B2 * | 7/2012 | Hosokawa et al. | 708/313 |
| 8,308,358 | B2 * | 11/2012 | Doorenbos | 374/172 |
| 2004/0170215 | A1 * | 9/2004 | Rossi et al. | 374/183 |
| 2005/0017889 | A1 * | 1/2005 | Stockstad | 341/164 |
| 2006/0125670 | A1 * | 6/2006 | Cho | H03M 1/0863 341/144 |
| 2006/0271895 | A1 * | 11/2006 | Tran | G06F 17/5036 257/532 |
| 2009/0085785 | A1 * | 4/2009 | Gerfers | H03M 1/1033 341/143 |
| 2009/0285261 | A1 * | 11/2009 | Casey et al. | 374/178 |
| 2013/0170520 | A1 * | 7/2013 | Englasyam et al. | 374/178 |

OTHER PUBLICATIONS

Pertijs, M.A. et al., "A CMOS Smart Temperature Sensor With a 3σ Inaccuracy of ±0.1° C. From −55° C. to 125° C.", IEEE Journal of Solid-State Circuits, Dec. 2005, 40(12):2805-2815.
Pertijs, M.A. et al., "Low-Cost Calibration Techniques for Smart Temperature Sensors", IEEE Sensors Journal, Jun. 2010, 10(6):1098-1105.

* cited by examiner

*Primary Examiner* — Lisa Caputo
*Assistant Examiner* — Nasir U Ahmed
(74) *Attorney, Agent, or Firm* — Duane Morris LLP (57) ABSTRACT

A thermal sensing system includes a circuit having a layout including standard cells arranged in rows and columns. First and second current sources provide first and second currents, respectively. The thermal sensing system includes thermal sensing units, first and second switching modules, and an analog to digital converter (ADC). Each thermal sensing unit is configured to provide a voltage drop dependent on a temperature at that thermal sensing unit. The first switching module is configured to select one of the thermal sensing units. The second switching module includes at least one switch controllable by a control signal. The at least one switch is configured to selectively couple the thermal sensing units, based on the control signal, to one of the first and second current sources, via the first switching module. The ADC is configured to convert an analog voltage, provided by the selected thermal sensing unit, to a digital value.

9 Claims, 7 Drawing Sheets

SMALL AREA HIGH PERFORMANCE CELL-BASED THERMAL DIODE

This application claims the benefit of U.S. Provisional Patent Application No. 61/592,658, filed Jan. 31, 2012, which is incorporated by reference herein in its entirety.

BACKGROUND

In various circuit applications, heat dissipation plays an increasingly important role. With the high gate count and high operating frequency of modern system-on-a-chip (SoC) implementations, the thermal issue is escalated in prominence, especially for 2.5D or 3D integrated circuit (IC) applications. Some areas on a chip may be relatively hot and others may be relatively cool, and monitoring of the "hot spots" may be needed for effective circuit performance.

Conventional thermal sensing systems have employed devices such as transistors that exhibit temperature dependencies. In systems that use a single transistor to sense the temperature at a given location, a problem arises due to the resistance associated with routing the transistor to an adjacent (local) digital ground of a digital circuit. A voltage drop $\Delta V$ associated with such a routing resistance may degrade performance and provide an incorrect temperature reading as the value of the $\Delta V$ for each of the plurality of locations may vary. In order to overcome that $\Delta V$ problem, circuits designers have previously been forced to route the transistor to an analog ground that may be located far from the transistor to provide a common reference voltage, thereby disadvantageously increasing routing length, die area, and overall cost.

Some prior thermal sensing approaches have used a differential approach in which a pair of transistors is used to monitor temperature at a given location. The use of paired transistors addresses the foregoing $\Delta V$ problem but introduces other drawbacks. For example, using a differential transistor configuration may double the number of transistors, thereby increasing component cost and die area, which is problematic given the large number of transistors that may be used in a typical SoC thermal sensing application. Furthermore, using two devices instead of one to sense temperature introduces problems due to device mismatch (e.g., due to process variation), which may degrade performance.

BRIEF DESCRIPTION OF THE DRAWINGS

The following will be apparent from elements of the figures, which are provided for illustrative purposes and are not necessarily to scale.

DETAILED DESCRIPTION

This description of certain exemplary embodiments is intended to be read in connection with the accompanying drawings, which are to be considered part of the entire written description. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. Likewise, terms concerning electrical coupling and the like, such as "coupled," "connected" and "interconnected," refer to a relationship wherein structures communicate with one another either directly or indirectly through intervening structures unless expressly described otherwise.

Figure 1:
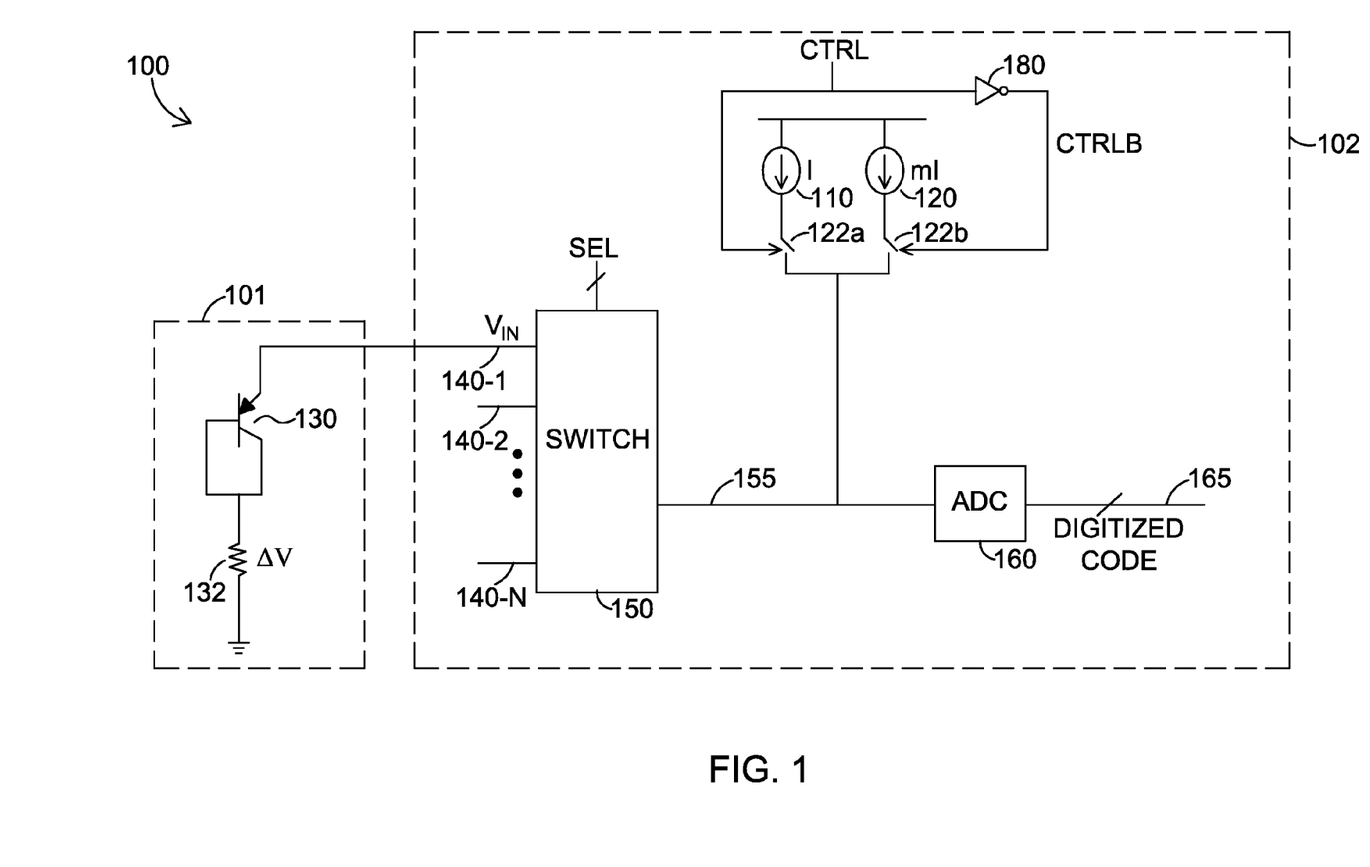
FIG. 1 is a circuit diagram of a thermal sensing system in accordance with some embodiments.
Figure 7:
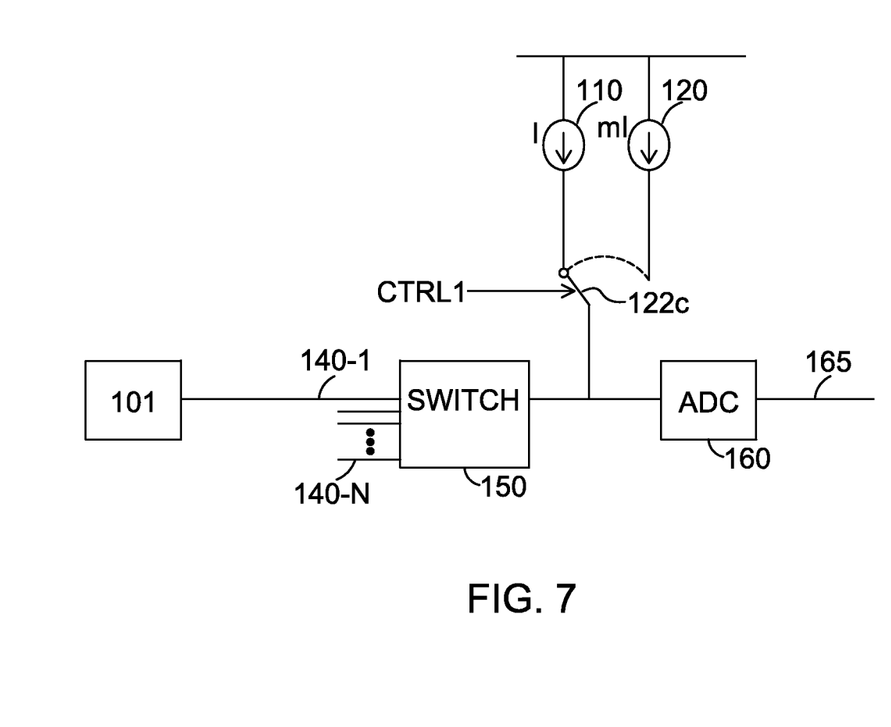
FIG. 7 is a schematic diagram of a single pole double throw switching configuration in accordance with some embodiments.

FIG. 1 is a circuit diagram of a thermal sensing system 100 in accordance with some embodiments. A component 101 is part of a local sensing unit for a chip. Several local components 101 may be distributed on the chip at various locations. A component 102 is part of a global circuit for the chip. In global component 102, a first current source 110 provides a first current I, and a second current source 120 provides a second current greater than the first current. The second current may m times the first current, e.g., a current m*I where m may be any value. Switches 122a and 122b, shown here in a double pole single throw (DPST) configuration, are coupled to the respective current sources 110, 120. Switches 122a and 122b are controlled by a control signal CTRL and its complement CTRLB that is provided by an inverter 180. Switches 122a and 122b selectively couple one of the current sources to a node 155. Although both switches 122a, 122b are shown in an open state in FIG. 1 for visual clarity, one of the switches is open and the other is closed at any given time. Thus, thermal sensing unit 130 is coupled to a single one of the current sources 110, 120 at a given time. Although two switches 122a, 122b are shown in the example of FIG. 1, equivalent switching functionality (i.e., coupling one of the current sources to the thermal sensing unit) may be provided by just one switch, e.g., a switch 122c in a single pole double throw (SPDT) configuration controlled by a signal CTRL1 shown in FIG. 7. Switches 122a, 122b may be implemented as metal oxide semiconductor ("MOS") transistors in which the gates of the transistors are coupled to receive the CTRL and CTRLB signals for selectively coupling current sources 110 or 120, respectively, to thermal sensing unit 130 as will be understood by one skilled in the art.

Thermal sensing unit 130 provides a temperature-dependent signal for measurement purposes. For example, thermal sensing unit 130 may be a transistor, e.g., a PNP bipolar junction transistor (BJT). BJT 130 functions as a thermal diode, because the base-emitter voltage drop $V_{BE}$ is dependent on temperature. Typically, $V_{BE}$ decreases as temperature increases.

Node 140-1 coupled to the emitter of BJT 130 is provided to a switch 150 along with similar nodes 140-2, ..., 140-N (collectively referred to as "nodes 140" or "input nodes 140") coupled to emitters of other BJTs (not shown in FIG. 1) in the case of N BJTs for sensing temperature at N locations. In some embodiments, only a single BJT is used (e.g., for sensing temperature at only one location on a chip), in which case switch 150 is not needed.

Switch 150 selects one of its input nodes 140 based on a signal SEL. If the voltage signal $V_{IN}$ at node 140-1 is selected, for example, then that analog voltage signal is provided at the output node 155 of the switch and is converted to a digital voltage signal by analog-to-digital converter (ADC) 160. The resulting digitized code 165 provides an accurate temperature reading at the location of the respective thermal sensing unit based on the respective input node 140. Switch 150 and ADC 160 are part of global circuitry 102 coupled to each of the plurality of local components 101.

Figure 4:
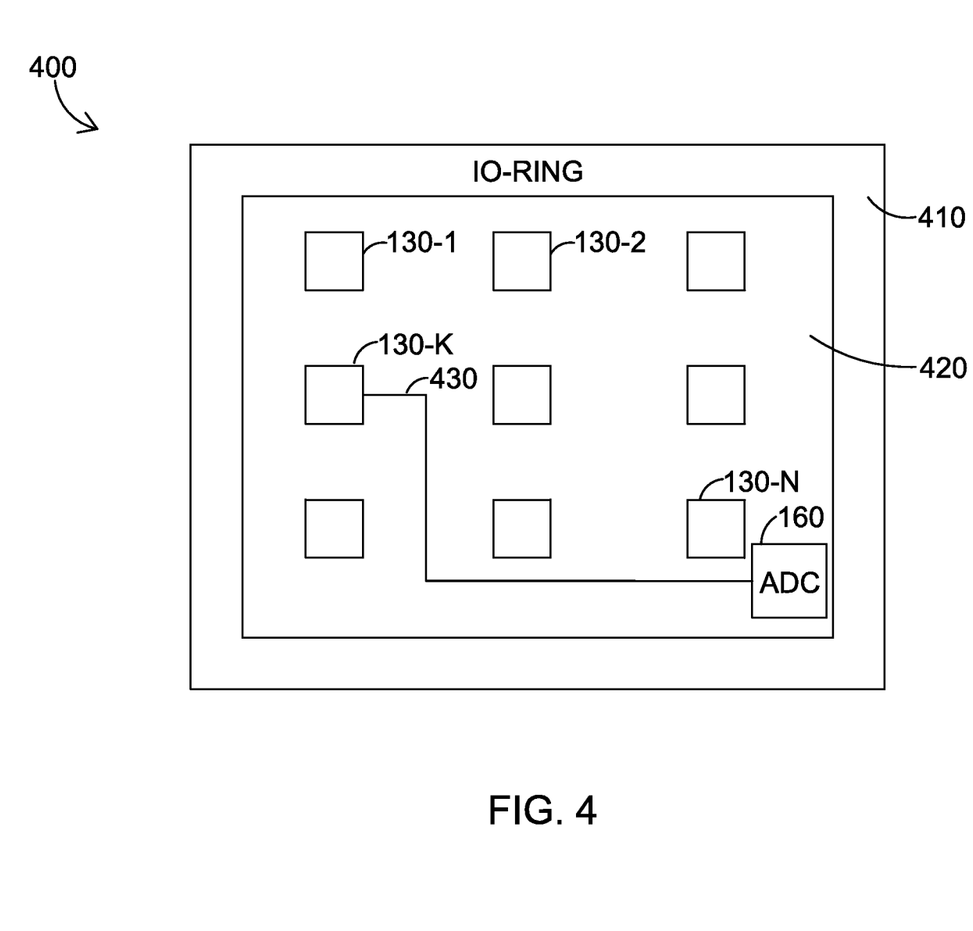
FIG. 4 is a plan view of a chip having multiple thermal sensing units in accordance with some embodiments.

Thermal sensing unit 130 may be one of a plurality of thermal sensing units 130-1, 130-2, . . . , 130-N that may be distributed throughout chip 100 as shown in FIG. 4. Referring to FIG. 1, current sources 110 and 120, switches 122a and 122b, switch 150, and ADC 160 may be part of the global, shared component 102 of the thermal sensing system. In other words, these global components need not be replicated at each location at which temperature is to be sensed. Thus, in some embodiments, only a single thermal sensing unit 130 (e.g., a thermal diode such as a BJT) is part of a local component 101 that is distributed at each of several locations on a chip at which temperature is to be sensed, reducing hardware requirements.

Figure 2:
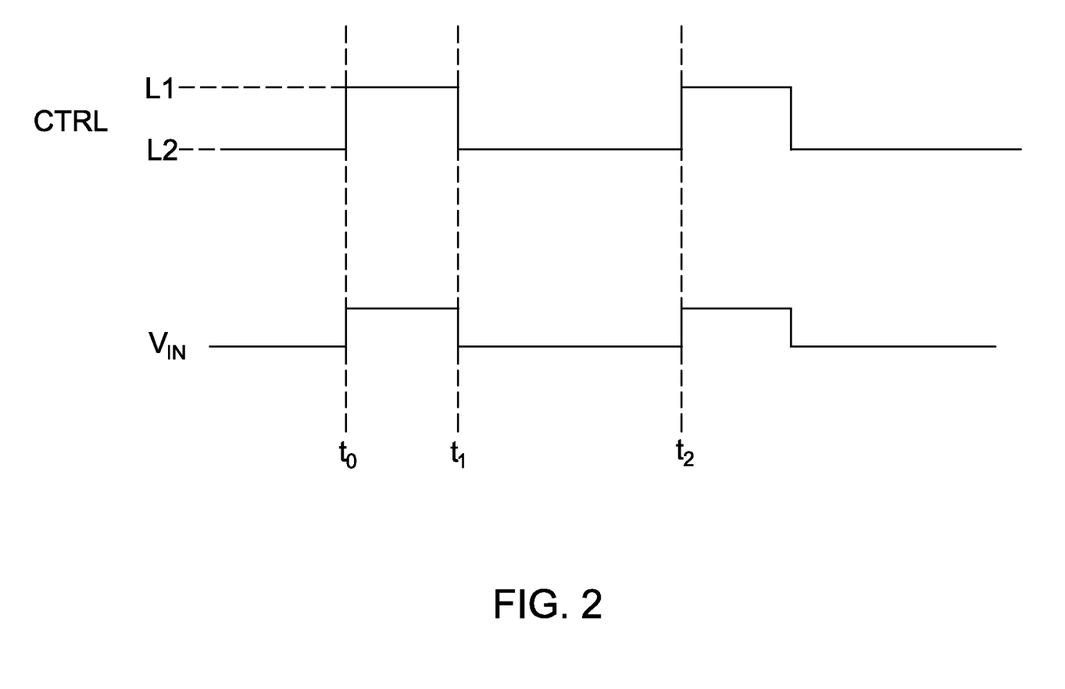
FIG. 2 is a signal trace diagram showing a control signal and a monitored voltage signal in accordance with some embodiments.

The control signal CTRL may be a periodic binary signal as shown in FIG. 2. Each period may have a first phase, e.g., from time $t_0$ to $t_1$, and a second phase, e.g., from time $t_1$ to $t_2$. During the first phase, the control signal CTRL has a first level L1 that causes current source 120 (corresponding to current m*I) to be coupled to BJT 130. During the second phase, the signal has a second level L2 that causes current source 110 (corresponding to current I) to be coupled to BJT 130. The first and second phases may have unequal durations. For example, the duration of the first phase may be shorter than the duration of the second phase.

The voltage $V_{IN}$ depends on whether switches 122a and 122b couple current source 110 or current source 120 to the BJT. Thus, $V_{IN}$ may be a periodic signal as shown in FIG. 2.

For a BJT operating in the forward-active region, the base-emitter voltage drop $V_{BE}$ is a function of temperature T according to the following equation: $V_{BE}(T)=k*T/q*\ln(I_B/I_S)$, where "ln" denotes the natural logarithm, k is Boltzmann's constant, T is absolute temperature in Kelvins, q is the charge of an electron in Coulombs, $I_B$ is the unit bias current, and $I_S$ is the transistor's saturation current. $I_B$ and $I_S$ are dependent on temperature. The voltage $V_{BE\_I}$ is the base-emitter voltage drop when BJT 130 is coupled to current source 110, and the voltage $V_{BE\_mI}$ is the base-emitter voltage drop when the BJT is coupled to current source 120.

Figure 3:
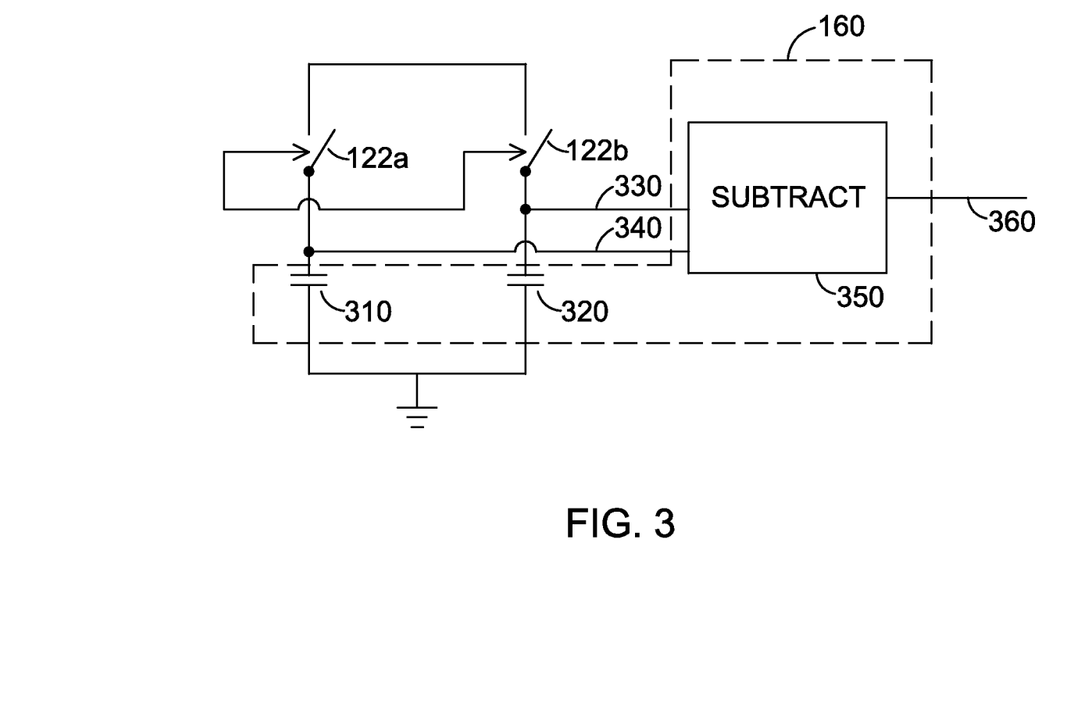
FIG. 3 is a circuit diagram of a state storage mechanism in accordance with some embodiments.

Referring to FIG. 3, both voltage states are stored on capacitors 310, 320 at a sample-hold block of ADC 160. Thermal change occurs on a relatively slow time scale, so that no appreciable temperature variation occurs during a period of the control signal CTRL, which may be on the order of 1 μs. Therefore, the voltages stored on the capacitors 310, 320 provide a reliable indication for temperature sensing. The charging speed for each capacitor depends on the bias current (e.g., I or m*I), because the charging time of each capacitor is proportional to the ratio of capacitance to current. Nodes 330 and 340 may be provided to a subtraction module 350, which provides at its output 360 the difference $(V_{BE\_mI}+\Delta V)-(V_{BE\_I}+\Delta V)$, where $\Delta V$ is the voltage drop associated with the resistance 132 for routing BJT 130 to ground. In other words, the voltage at node 360 is equal to $V_{BE\_mI}-V_{BE\_I}$. Thus, through dynamic, two-phase switching, the voltage term $\Delta V$ that is common to both coupling configurations (i.e., coupling to current source 110 or current source 120) is eliminated. Embodiments of the present disclosure advantageously emulate a differential sensing technique, which eliminates the term $\Delta V$, utilizing a single transistor at a given location rather than two transistors. The use of a single transistor at single local sensing location eliminates device mismatch errors common to differential sensing techniques.

The expression $V_{BE\_mI}-V_{BE\_I}$ corresponds to $k*T/q*\ln(m*I/I_S)-k*T/q*\ln(I/I_S)$, which may be rewritten as $k*T/q*\ln(m)$. This analog, temperature-dependent voltage is converted to digital as digitized code 165 by ADC 160. ADC may be implemented as a pipelined ADC, a switched capacitor ADC, a resistor ladder, or other ADC as will be understood by one skilled in the art.

The various embodiments described above advantageously utilize dynamic, two-phase current switching to emulate a differential sensing technique to eliminate voltage uncertainty, i.e., $\Delta V$, between different thermal sensing units 130. As a result, BJT 130 does not have to be coupled to an analog ground but may instead be grounded by an adjacent digital ground of a digital circuit.

Referring first to FIG. 4, a chip 400 in accordance with some embodiments has an input/output ring region 410 that provides input/output circuitry of the chip and a region 420 corresponding to a digital circuit layout composed of standard layout cells (standard cells). As will be understood by one of ordinary skill in the art, standard cells may be arranged in a regular, repeating pattern of rows and columns in digital circuit design. Multiple thermal sensing units 130-1, 130-2, . . . , 130-N may be positioned at various locations in region 420 to provide thermal sensing at those locations. An analog voltage line 430 may be routed from thermal sensing unit 130-k to ADC 160 as shown in FIG. 4. Voltage line 430 may correspond to signal $V_{IN}$ of FIG. 1. Switch 150 and the analog voltage lines (similar to voltage line 430) from other thermal sensing units are not shown in FIG. 4 for visual simplicity. Embodiments of the present disclosure do not require routing of analog ground lines to a global circuit for use as a reference. Instead, the disclosed embodiments use a single BJT 130 that is selectively coupled to different current sources to generate two distinct voltage signals, which may be subtracted from one another to determine a sensed analog voltage level. Consequently, the shielding of such analog ground lines may be eliminated. Thus, various embodiments decrease cost, die area, and circuit complexity.

Figure 5A:
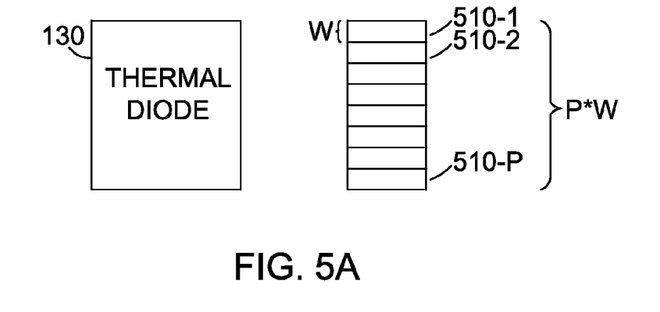
FIGS. 5A-5B are illustrations of alignment between a thermal diode and adjacent standard cells of a circuit layout in accordance with some embodiments.

In order to efficiently implement thermal sensing units in a digital circuit, the thermal sensing units may have a cell-based layout structure that is aligned with adjacent standard cells. One of ordinary skill understands that for various automatic placement and routing (APR) technologies, standard cells are used in circuit layout to gain efficiencies from repeating, predictable structures, e.g., arranged in rows and columns. For example, standard cells are generally provided with uniform length and width, and with their own local power and ground lines, to provide a consistent framework for a circuit designer. In various embodiments of the present disclosure, a thermal sensing unit 130 (e.g., a thermal diode which may be a BJT) has a dimension (e.g., width P*W) that is an integer multiple of a corresponding dimension (e.g., width W) of a standard cell of a circuit layout. For example, referring to FIG. 5A, thermal diode 130 has a width that is P times the width of each standard cell 510-1, 510-2, . . . , 510-P.

Figure 5B:
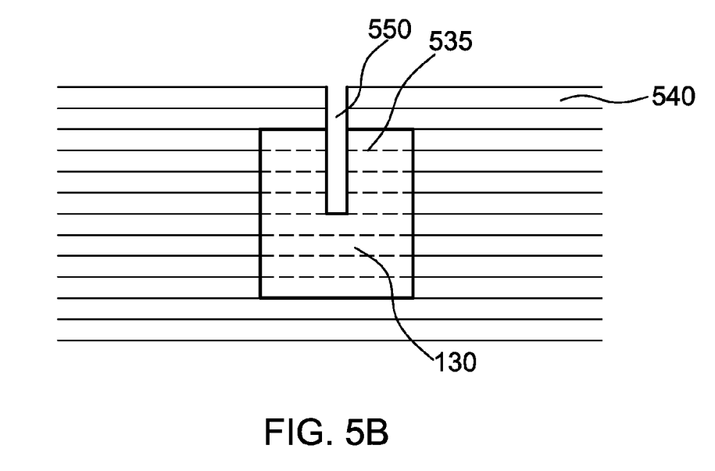

With the thermal diode 130 dimensioned in this manner, the thermal diode 130 may be inserted to the standard cell layout such that the power and ground metal lines (denoted generally as dashed lines 535 in FIG. 5B) of the digital circuit forming the thermal diode 130 align (line up) with power and ground metal lines of adjacent standard cells. The surrounding standard cells are denoted generally as 540 in FIG. 5B. A metal line 550 may route an analog signal (e.g., $V_{IN}$ of FIG. 1) from/to the thermal diode.

Thus, with the width P*W (vertical axis of FIGS. 5A and 5B) of the thermal diode 530 dimensioned to align with neighboring standard cells, layout of the thermal sensing system is efficient, with no die area penalty. Additionally, there is easy integration due to power and ground connections supplied by adjacent standard cells. Ground for a thermal diode of the various embodiments described herein advantageously need not be obtained by costly, cumbersome analog routing, but is instead provided by digital ground from standard cells in an efficient manner.

Thus, embodiments of the present disclosure improve thermal diode performance, e.g., by eliminating the voltage variations ΔV, which are attributed to the routing of reference voltages, that degrades performance of prior systems, without requiring two BJTs at each location for such performance improvement. Performance is also improved because with only one BJT at each location rather than two to generate a proportional to absolute temperature (PTAT) source for the ADC input, there is no concern about mismatch between two BJTs at a single location. Additionally, layout efficiencies for standard cell-based thermal diodes reduce routing requirements and overall cost.

Figure 6:
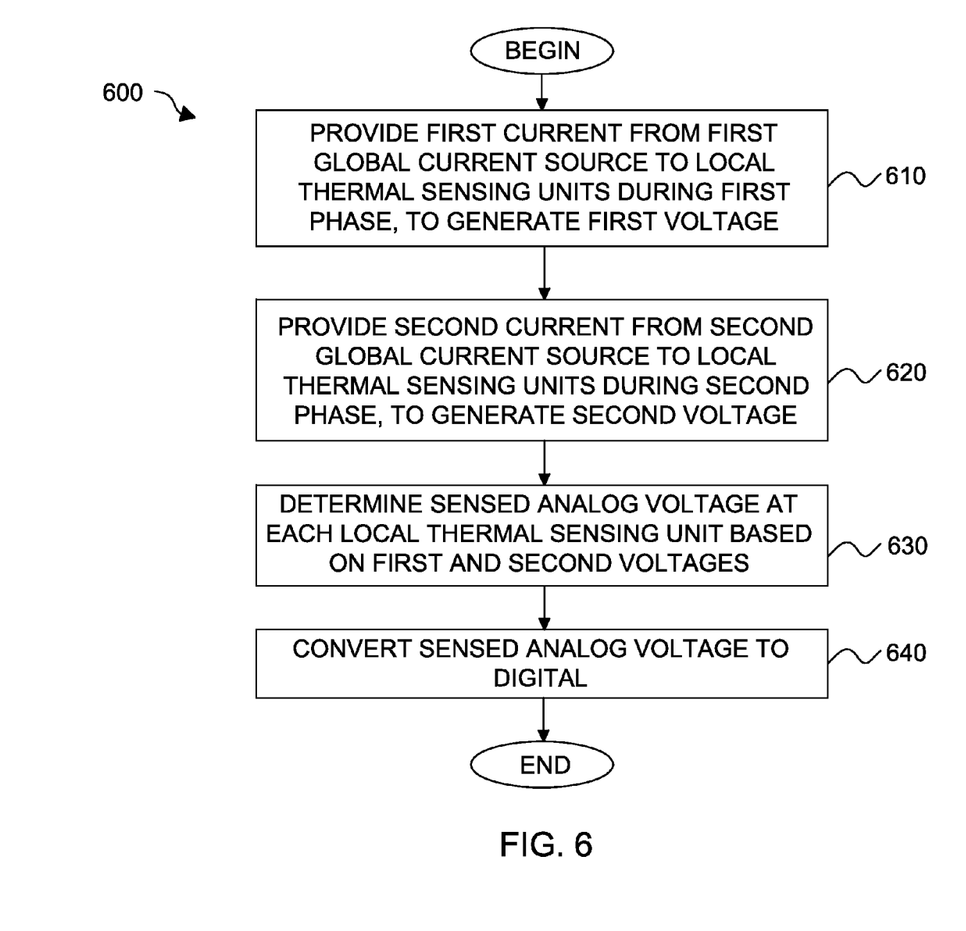
FIG. 6 is a flow diagram of a process in accordance with some embodiments.

FIG. 6 is a flow diagram of a process 600 in accordance with some embodiments. After process 600 begins, a first current is provided (610) from a first global current source to a plurality of local thermal sensing units during a first phase such that each of the plurality of local thermal sensing units respectively generates a first voltage. A second current is provided (620) from a second global current source to the plurality of local thermal sensing units during a second phase such that each of the plurality of local thermal sensing units respectively generates a second voltage. The second current is different than the first current. A sensed analog voltage is determined (630) at each of the plurality of local thermal sensing units based on the respective first and second voltages. The sensed analog voltage is converted (640) to a digital voltage.

In some embodiments, an apparatus includes a global current switching module and one or more local devices. Each local device is coupled to an output of the current switching module directly or via a switch. The global current switching module includes a first current source providing a first current, and a second current source providing a second current different than the first current. The global current switching module also includes at least one switch controllable by a control signal. The switch is configured to couple one of the first and second current sources to the output of the global current switching module. The local devices are disposed at different locations on an integrated circuit chip. Each local device is configured to provide, at the output of the global current switching module, a voltage dependent on the temperature at the respective local device.

In some embodiments, a thermal sensing system includes a circuit having a layout including a plurality of standard cells arranged in rows and columns. The thermal sensing system also includes a first current source providing a first current, a second current source providing a second current different than the first current, multiple thermal sensing units, first and second switching modules, and an analog to digital converter (ADC). Each thermal sensing unit is configured to provide a voltage drop dependent on a temperature at that thermal sensing unit. The first switching module is coupled to each of the thermal sensing units and is configured to select one of the thermal sensing units. The second switching module includes at least one switch controllable by a control signal. The at least one switch is configured to selectively couple the thermal sensing units, based on the control signal, to one of the first and second current sources, via the first switching module. The ADC is configured to convert an analog voltage, provided by the selected thermal sensing unit, to a digital value.

In some embodiments, a first current is provided from a first global current source to a plurality of local thermal sensing units during a first phase such that each of the plurality of local thermal sensing units respectively generates a first voltage. A second current is provided from a second global current source to the plurality of local thermal sensing units during a second phase such that each of the plurality of local thermal sensing units respectively generates a second voltage. The second current is different than the first current. A sensed analog voltage is determined at each of the plurality of local thermal sensing units based on the respective first and second voltages. The sensed analog voltage is converted to a digital voltage.

Although examples are illustrated and described herein, embodiments are nevertheless not limited to the details shown, since various modifications and structural changes may be made therein by those of ordinary skill within the scope and range of equivalents of the claims.

What is claimed is:

1. An apparatus comprising:
   a global current switching module including:
      a first current source for providing a first current,
      a second current source for providing a second current different than the first current,
      at least one first switch controllable by at least one control signal, the at least one first switch configured to couple the first current source to a node of the global current switching module during a first phase and to couple the second current source to the node of the global switching module during a second phase, and
      at least one second switch coupled to the node of the global current switching module; and
   a plurality of local devices each including a single transistor, each local device being selectively coupled to the node of the global current switching module through the at least one second switch, each local device disposed at a different location on an integrated circuit chip and configured to provide, at the node of the global current switching module, a voltage dependent on the temperature at the respective local device in response to being coupled to the node of the global current switching module through the at least one second switch,
   wherein the voltage provided by each local device when coupled to the node comprises a first voltage generated during the first phase when the first current source is coupled to the node and a second voltage generated during the second phase when the second current source is coupled to the node.

2. The apparatus of claim 1, wherein the at least one first switch includes a single pole double throw (SPDT) switch.

3. The apparatus of claim 1, wherein the at least one switch includes a pair of single throw switches coupled to the first and second current sources, respectively.

4. The apparatus of claim 1, wherein the control signal is a periodic binary signal.

5. The apparatus of claim 1, wherein the first and second phases have unequal durations.

6. The apparatus of claim 5, wherein the first phase is longer than the second phase.

7. The apparatus of claim 1, wherein each of the one or more devices is coupled to a local ground line of a standard cell of a circuit.

8. The apparatus of claim 1, wherein the width of the one or more devices in a circuit layout is an integer multiple of the width of a standard cell of a circuit.

9. An apparatus comprising:
a global current switching module including:
a first current source for providing a first current,
a second current source for providing a second current different than the first current,
at least one first switch controllable by a control signal, the at least one first switch configured to couple the first current source to a first node of the global current switching module during a first phase and to couple the second current source to the first node of the global current switching module during a second phase, and
at least one second switch coupled to the first node of the global current switching module; and
a plurality of local devices, each local device coupled to the at least one second switch of the global current switching module, each local device disposed at a different location on an integrated circuit chip and configured to provide, at the first node of the global current switching module by way of the at least one second switch, a voltage dependent on the temperature at the respective local device,
wherein the at least one second switch is configured to couple a selected one of the plurality of local devices to the first node in response to a select signal received at the at least one second switch,
wherein the voltage provided by each local device when coupled to the first node comprises a first voltage generated during the first phase when the first current source is coupled to the node and a second voltage generated during the second phase when the second current source is coupled to the node.

* * * * *